J. B. Worsham,
Tobacco Belting Knife.
Nº 64,823.  Patented May 14, 1867.
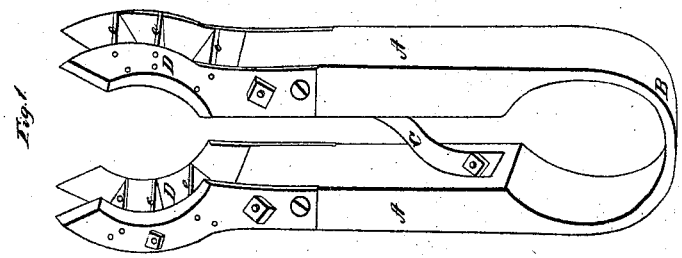
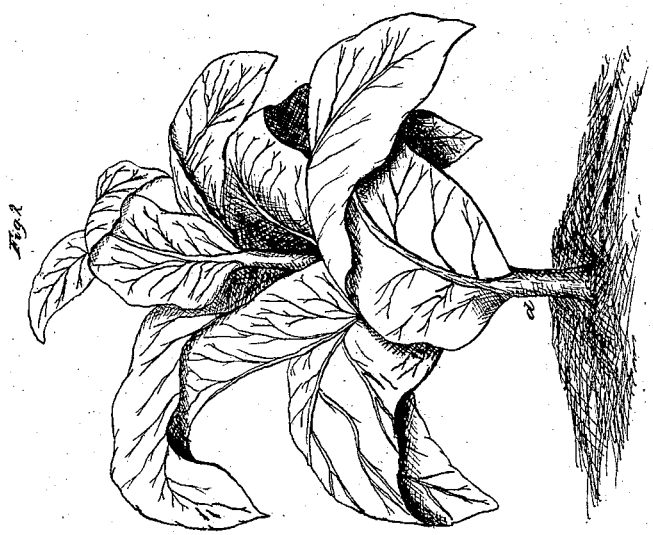
Witnesses
Phil. Choppell
C. W. Samuel
Inventor
Joseph B. Worsham

United States Patent Office.

JOSEPH B. WORSHAM, OF HIBERNIA, MISSOURI.

Letters Patent No. 64,823, dated May 14, 1867.

IMPROVEMENT IN TOBACCO-BELTING KNIFE.

The Schedule referred to in these Letters Patent and making part of the same.

Be it known that I, JOSEPH B. WORSHAM, of Hibernia, in the county of Calloway, in the State of Missouri, have invented an improved Process in the Treatment of Growing Tobacco, and also an improved implement for applying said process; and I do hereby declare that the following is a clear, full, and exact description thereof, reference being had to the accompanying drawings, making part of this specification, and to the letters of reference marked thereon.

My invention consists, first, in a process of girdling or belting the growing plant prior to its being cut for the purpose of stopping the flow of the sap, and thereby causing it to assume a yellow color; and, second, in the novel construction of an implement for effecting the girdling or belting operation.

Figure 1 is a perspective view of the implement.

Figure 2 a view of a plant prior to the operation; and

Figure 3 a representation of the plant after the operation has been performed.

In raising tobacco it is customary to break or bend down the plant for some time prior to its being finally cut and removed from the field in order to stop its growth and give to the leaves a yellow collor, which is technically denominated "yellowing" it, the object being to impart to the tobacco a deep yellowish color and an oily condition to the leaf, by which its value and quality are greatly improved. When this is done by the usual process of bending or breaking down the plant the leaves are more or less injured by being brought in contact with the earth, especially if rainy weather ensues, the leaves being liable to rot, and also by having the loose earth and grit dashed or washed upon and adhering to them. My process consists in girdling or belting the plant while standing and causing it to "yellow" in that condition, instead of breaking or bending it down, by which means I obviate the objections above named and at the same time secure a much more perfect "yellowing" of the leaves, as they remain exposed to the free action of the atmosphere and sunlight, far more perfectly than when bent or broken down and lying in a mass on the earth. In order to perform this girdling or belting process with rapidity and perfection, I employ the instrument represented in fig. 1. This implement consists the handles A united by a spring-bow, B, similar to the handle of sheep-shears, a spring, C, being placed of between the handles A to cause them to open automatically the same as with sheep-shears. To the front end of each of the handles A I attach two curved blades D, having sharp edges on their inside, as represented. A series of vertical blades e—three, more or less, in number—are secured between each pair of the blades D, and having their edges flush, or nearly so, with the inner edges of the blades D, as shown in fig. 1. In the drawings the handles A are represented as made of wood, but it is obvious that they may be made entirely of metal, if desired.

With the instrument thus constructed I proceed to girdle or belt the plants at the proper time. This I do by applying the curved blades to the stem of the plant, at d of fig. 1, just below the leaves, and, closing the blades upon the stem, turn the knife or implement to the right and left alternately, by which operation the blades D cut two circular incisions entirely around the stem, the blades e at the same time scraping or removing the strip of bark or outer coating from the stem, as represented at b of fig. 3. It is obvious that when this is done the sap will cease to flow and the result will be that the plant will turn yellow and change its condition, as represented in fig. 3, and as previously described. The plant is then left standing in this condition for about two weeks, the length of time depending on the condition of the crop and the state of the weather, when it is cut and removed from the field to the dry-house, after which it may be treated in the usual manner.

Having thus described my invention, what I claim, is—

The belting-knife or implement constructed and used substantially as herein shown and described.

JOSEPH B. WORSHAM.

Witnesses:
C. W. SAMUEL,
PHIL. E. CHAPPELL.